United States Patent
Xiao et al.

(10) Patent No.: US 12,537,215 B2
(45) Date of Patent: Jan. 27, 2026

(54) SECONDARY BATTERY

(71) Applicant: Dongguan Amperex Technology Limited, Guangdong (CN)

(72) Inventors: Liangzhen Xiao, Guangdong (CN); Qiao Zeng, Guangdong (CN)

(73) Assignee: Dongguan Amperex Technology Limited, Dongguan (CN)

( * ) Notice: Subject to any disclaimer, the term of this patent is extended or adjusted under 35 U.S.C. 154(b) by 1218 days.

(21) Appl. No.: 16/420,197

(22) Filed: May 23, 2019

(65) Prior Publication Data

US 2019/0280280 A1 Sep. 12, 2019

Related U.S. Application Data

(63) Continuation of application No. PCT/CN2017/107063, filed on Oct. 20, 2017.

(30) Foreign Application Priority Data

Nov. 23, 2016 (CN) .......................... 201621259513.5

(51) Int. Cl.
*H01M 10/04* (2006.01)
*H01M 50/536* (2021.01)
(Continued)

(52) U.S. Cl.
CPC ......... *H01M 10/04* (2013.01); *H01M 50/538* (2021.01); *H01M 50/54* (2021.01); *H01M 50/536* (2021.01)

(58) Field of Classification Search
CPC ............................ H01M 50/538; H01M 50/54
See application file for complete search history.

(56) References Cited

U.S. PATENT DOCUMENTS

| | | | |
|---|---|---|---|
| 2011/0052976 A1* | 3/2011 | Ishii | H01M 50/533 429/178 |
| 2012/0244423 A1* | 9/2012 | Kusukawa | H01M 50/186 429/178 |

FOREIGN PATENT DOCUMENTS

| | | |
|---|---|---|
| CN | 101454925 A | 6/2009 |
| CN | 102208672 A | 10/2011 |

(Continued)

OTHER PUBLICATIONS

International Search Report of PCT Patent Application No. PCT/CN2017/107063 issued on Jan. 30, 2018.

(Continued)

*Primary Examiner* — Daniel S Gatewood
(74) *Attorney, Agent, or Firm* — Maier & Maier, PLLC

(57) ABSTRACT

A secondary battery is provided, comprising a first adapter piece and an electrode assembly, comprising a first and second electrode plates, a plurality of first electrode tabs, a second electrode tab, a direction parallel to the first electrode plate being L, two end points in a thickness direction being T1 and T3, a position of one of the first electrode tabs farthest from T1 or T3 is T2; all the first electrode tabs are stacked to form a first multi-tab structure and connected to the first adapter piece, it further comprises a first adapter member comprising the first multi-tab structure and the first adapter piece; in the L direction, there is at most one layer of the first adapter member. The present application may reduce the existing waste of the top space caused by bending electrode tabs, and is more stable for the bending effect, improving the ED of battery.

18 Claims, 7 Drawing Sheets

(51) Int. Cl.
*H01M 50/538* (2021.01)
*H01M 50/54* (2021.01)

(56) References Cited

FOREIGN PATENT DOCUMENTS

| | | |
|---|---|---|
| CN | 102629678 A | 8/2012 |
| CN | 102694142 A | 9/2012 |
| CN | 202454681 U | 9/2012 |
| CN | 105489825 A | 4/2016 |
| CN | 106129319 A | 11/2016 |
| CN | 206332097 U | 7/2017 |
| KR | 20030040812 A | 5/2003 |

OTHER PUBLICATIONS

Evaluation Report of Utility Model Patent issued on May 4, 2018, in connection with corresponding Chinese Application No. ZL2017207195160 (9 pp., including English Abstract).
International Search Report issued on Jan. 30, 2018 in connection with corresponding International Application No. PCT/CN2017/107063; 6 pages.

* cited by examiner

SECONDARY BATTERY

CROSS REFERENCE TO RELATED APPLICATIONS

The present application is a continuation application of PCT Application No. PCT/CN2017/107063 filed on Oct. 20, 2017, which claims the priority of Chinese Patent Application No. 201621259513.5 filed on Nov. 23, 2016. The contents of all of the above are incorporated herein by reference in their entirety.

FIELD OF THE INVENTION

The present application relates to the field of batteries, in particular, to a secondary battery.

BACKGROUND OF THE INVENTION

At present, while pursuing high energy density batteries, the requirements for rate performance of batteries are getting higher and higher. For the discharge platform, there are higher requirements. In addition to the influence of the battery material itself, the battery structure design can also reduce the impedance of the battery through the multi-tab structure to improve the performance of the battery. As shown in FIG. 1, in the prior art, the electrode tab of the multi-tab wound structure uses a secondary bending electrode tab, which occupies more top space and reduces the energy density of the battery.

In view of this, the present application is specifically filed.

SUMMARY OF THE INVENTION

The object of the present invention is to propose a secondary battery.

In order to accomplish the object of the present application, the technical solution adopted is:

In one aspect of present application, a secondary battery is provided, comprising a first adapter piece and an electrode assembly, the electrode assembly comprising a first electrode plate, a second electrode plate, a plurality of first electrode tabs, and a second electrode tab, a direction parallel to the first electrode plate being L, two end points in a thickness direction of the electrode assembly being T1 and T3 respectively, wherein a position of one of the first electrode tabs farthest from T1 or T3 is T2; all the first electrode tabs are stacked to form a first multi-tab structure and connected to the first adapter piece, and the electrode assembly further comprises a first adapter member comprising the first multi-tab structure and the first adapter piece; in the L direction, there is at most one layer of the first adapter member.

The technical solution of the present application has at least the following beneficial effects: the technical solution of the present application may effectively reduce the existing waste of the top space caused by bending the electrode tabs, and is more stable for the bending effect, thereby improving the energy density of the battery.

wherein:
1—First adapter piece;
11—First connection position;
2—Electrode assembly;
21—First electrode plate;
22—First electrode tab;
23—First multi-tab structure;
L—L-direction parallel to the first electrode plate;
T—T-thickness direction of electrode assembly.

DETAILED DESCRIPTION OF THE PREFERRED EMBODIMENTS

The following further describes the present application in combination with specific embodiments. It should be understood that these embodiments are only used to illustrate the present application, but not for the limitation of the scope of the present application.

Figure 1:
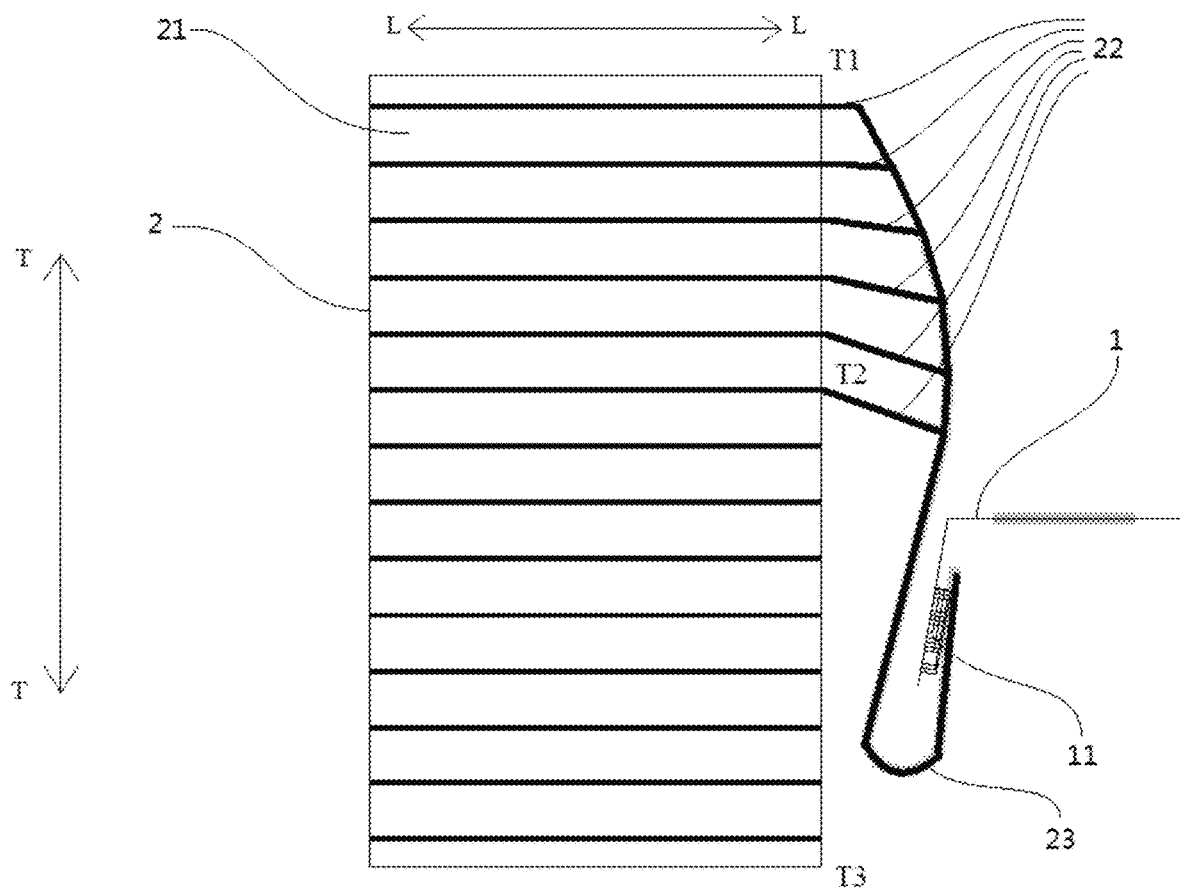
FIG. 1 is a schematic view of a secondary battery in the prior art.

A schematic view of a secondary battery of a conventional wound structure is shown in FIG. 1; two end points in a thickness direction (i.e., T-T direction) of the electrode assembly are T1 and T3 respectively. One electrode tab draws from each current collector, a position of one of the first electrode tabs farthest from T1 is T2, and both a first electrode tab 22 and a second electrode tab are drawn between T1 and T2 in the thickness direction of the battery. In this figure, the first adapter member is bent twice on one side of the battery, thereby occupying a large space in a L direction. The specific method of adapter welding is: the first electrode plate 21 between T1 and T2 in the thickness direction of the electrode assembly is provided with the first electrode tab 22, all of the first electrode tabs 22 are bent toward a center of the electrode assembly for extending and are neatly stacked; a plurality of first electrode tabs 22 may be pre-welded together, and then the untidy tail portions are cut away to form a first multi-tab structure 23, and then the first adapter piece 1 is adapting-welded for the first multi-tab structure 23 and the first adapter piece 1 to form a first adapter member; after welding, the first adapter member is bent on the other side in the thickness direction of the electrode assembly, and the first adapter piece 1 is taken out along the center of the electrode assembly to match the battery aluminum plastic punching double pit design. In this embodiment, there are two layers of first adapter members in the L direction of the electrode assembly 2.

Figure 2:
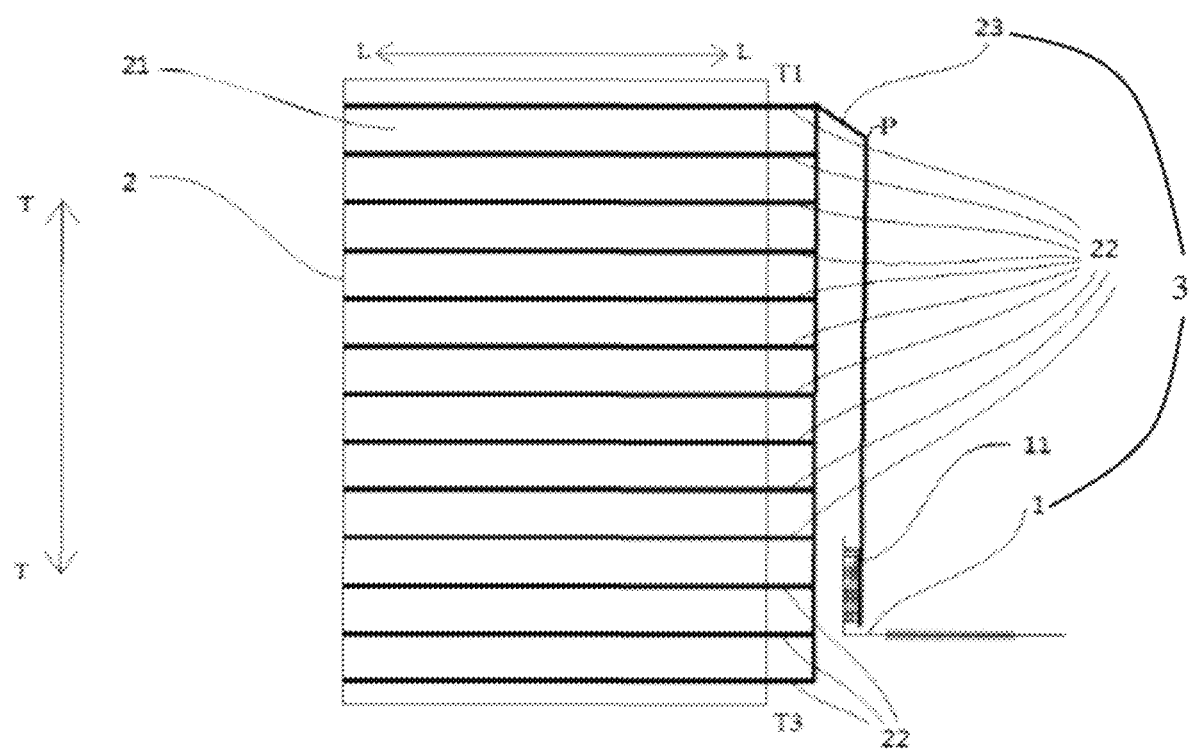
FIG. 2 is a schematic view of a secondary battery according to an embodiment of the present application.

The embodiment of the present application relates to a secondary battery, comprising a first adapter piece 1, a second adapter piece and an electrode assembly 2, the electrode assembly 2 comprising a first electrode plate 21, a second electrode plate, a first electrode tab 22 and a second electrode tab, two end points in a thickness direction of the electrode assembly being T1 and T3 respectively. In the present application, the electrode assembly 2 is a multi-tab electrode assembly 2, that is, at least two first electrode plates 21 are each provided with the first electrode tab 22, and all of the first electrode tabs 22 are stacked to form a first multi-tab structure 23 and connected to the first adapter piece 1. Alternatively, the first electrode plate 21 is provided with the first electrode tab 22 (in the present embodiment, there is no T2 point), as shown in FIG. 2, thereby more effectively reducing the battery impedance. The first multi-tab structure 23 and the first adapter piece 1 form a first adapter member 3, and in a L direction of the electrode assembly 2, there is at most one layer of the first adapter member 3, thereby effectively reducing the top space of the battery occupied by the multi-tab bending, further improving the energy density of the secondary battery. The first connection position partially overlaps or does not overlap with all of the first electrode tabs in the L direction, and alternatively does not overlap.

Figure 3:
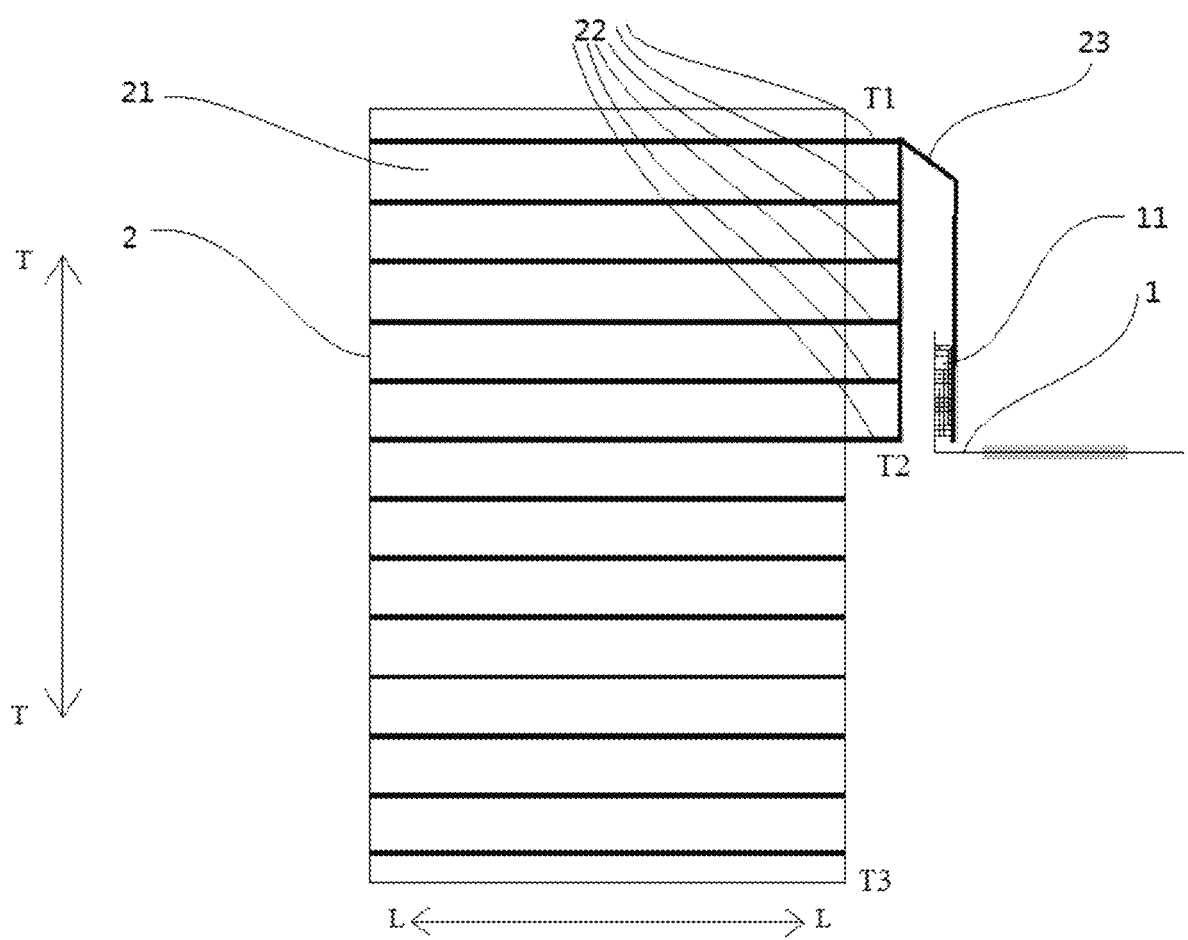
FIG. 3 is a schematic view of a secondary battery according to an embodiment of the present application.
Figure 4:
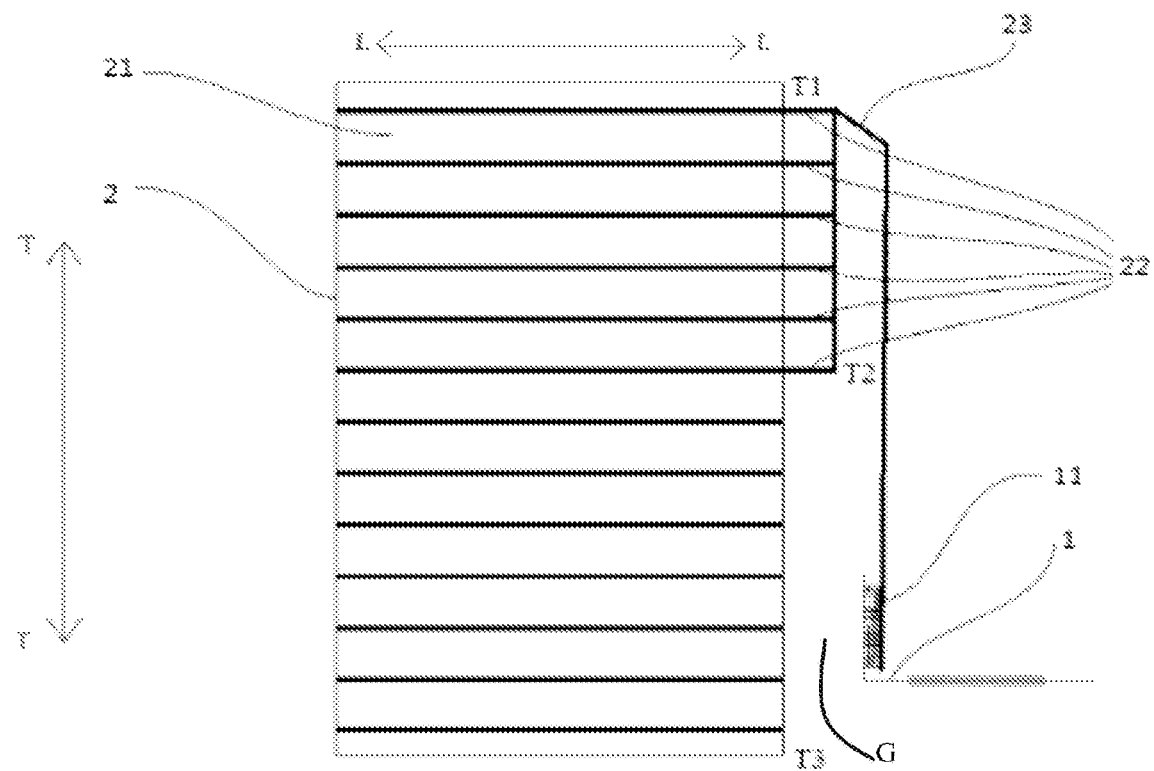
FIG. 4 is a schematic view of a secondary battery according to an embodiment of the present application.

In an embodiment of the present application shown in FIGS. 3 and 4, two end points in a thickness direction of the electrode assembly are T1 and T3 respectively. A position of one of the first electrode tabs farthest from T1 is T2, and all of the first electrode tabs 22 are located between T1 and T2 in the thickness direction of the battery. All of the first electrode tabs 22 are bent away from a center of the electrode assembly to form a first multi-tab structure 23, and the first multi-tab structure 23 is bent toward the center of the electrode assembly and then connected to the first adapter piece 1. Wherein, a first connection position 11 may be located between T1 and T2 or between T2 and T3 in the thickness direction.

When located between T1 and T2 of the electrode assembly 2, as shown in FIG. 3, the specific method of adapter welding is: the first electrode plate 21 between T1 and T2 is provided with the first electrode tab 22, and all of the first electrode tabs 22 are bent away from the center of the electrode assembly for extending and are neatly stacked to form the first multi-tab structure 23, followed by adapting-welding with the first adapter piece 1; after welding, the first adapter member is bent toward the center of electrode assembly at T2 position, and the first adapter piece 1 is led out along the center of the electrode assembly, so as to match the battery aluminum plastic punching double pit design. In this embodiment, there is only one layer of first adapter member in the L direction of the electrode assembly 2, and with respect to the first electrode plate 21, there is no first adapter member between T2 and T3 in the thickness direction of the electrode assembly, thereby greatly saving the space at the top of the battery.

Further, as shown in FIG. 4, the connection position of the first multi-tab structure 23 and the first adapter piece 1 may continue to extend along the thickness direction of the electrode assembly for being between T2 and T3 in the thickness direction of the electrode assembly, that is, the first connection position 11 is located between T2 and T3 in the thickness direction of the electrode assembly, and the first electrode plate 21 between T1 and T2 in the thickness direction of the electrode assembly is provided with the first electrode tab 22, so that a gap G width between the first adapter member and the electrode assembly 2 may be further reduced. In this embodiment, there is only one layer of first adapter member in the L direction of the electrode assembly.

Figure 5:
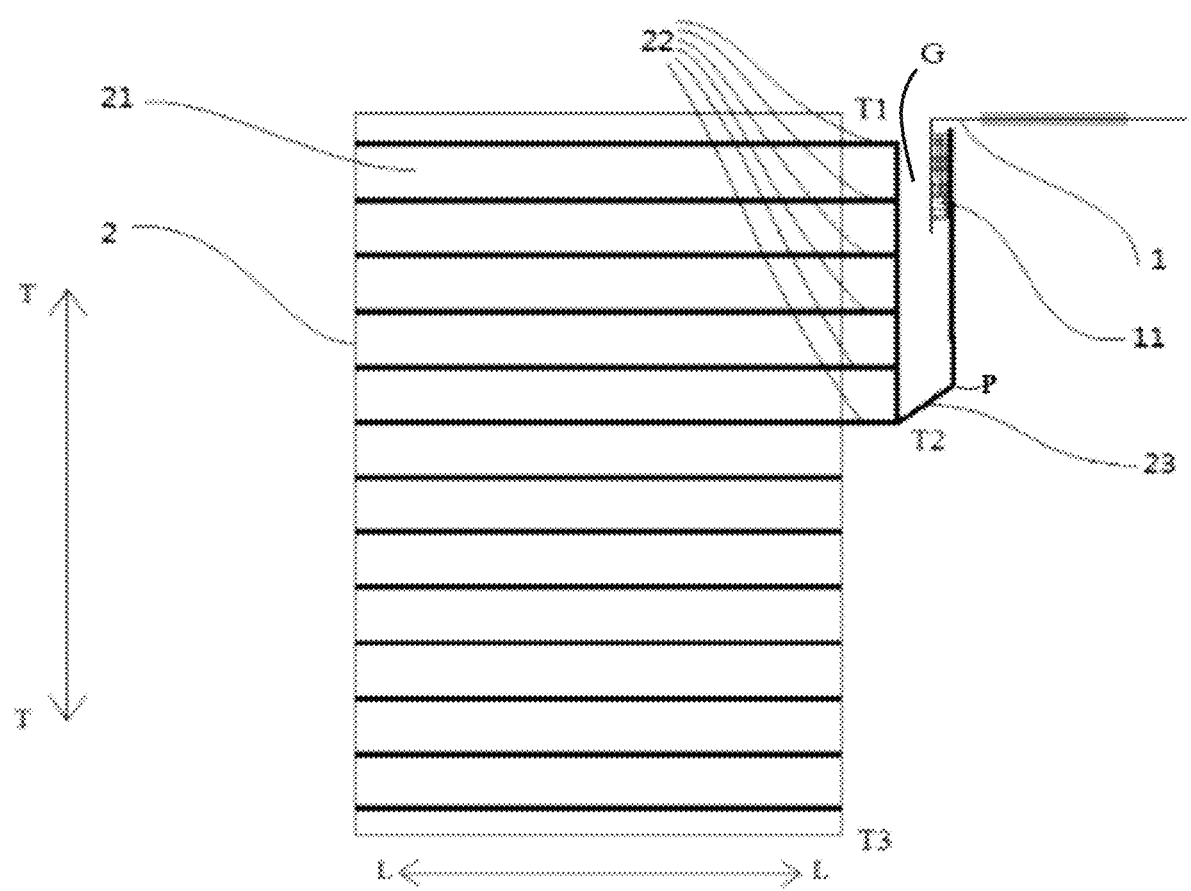
FIG. 5 is a schematic view of a secondary battery according to an embodiment of the present application.

In an embodiment of the present application shown in FIG. 5, two end points in a thickness direction of the electrode assembly are T1 and T3 respectively, and the position of one of the first electrode tabs farthest from T1 is T2; the first electrode plate 21 between T1 and T2 in the thickness direction of the electrode assembly is provided with the first electrode tab 22; all of the first electrode tabs 22 are bent toward the center of the electrode assembly to form a first multi-tab structure 23, and the first multi-tab structure 23 is bent away from the center of the electrode assembly and then connected to the first adapter piece 1; the bending point P of the first multi-tab structure 23 and all of the first electrode tabs 22 are located between T1 and T2 in the thickness direction of the electrode assembly. In this embodiment, the first adapter piece 1 is drawn along the same side as the first electrode tab 22, and is suitable for the design of the battery outer package film as a single pit.

Figure 6:
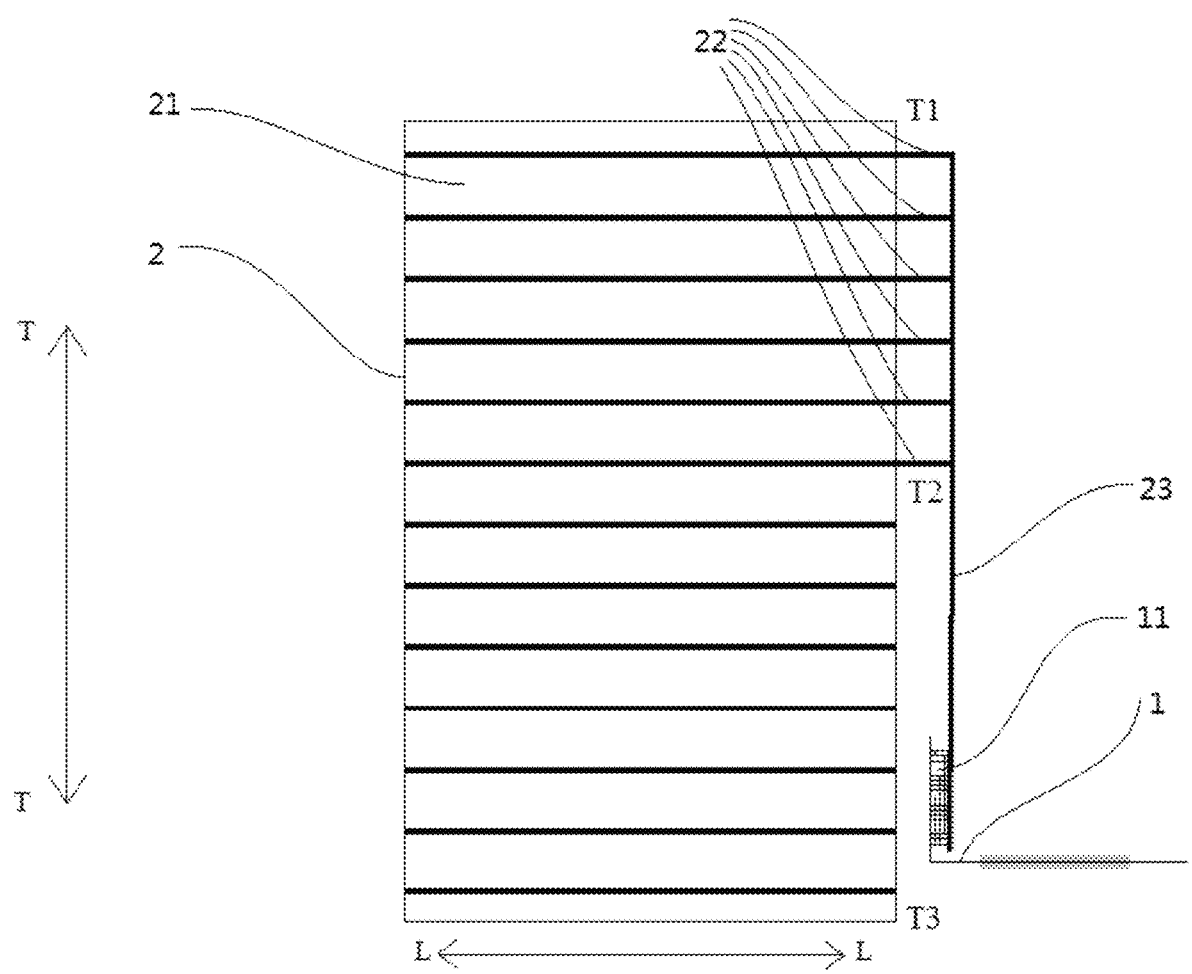
FIG. 6 is a schematic view of a secondary battery according to an embodiment of the present application.

In an embodiment of the present application shown in FIG. 6, two end points in a thickness direction of the electrode assembly are T1 and T3 respectively, and the position of one of the first electrode tabs farthest from T1 is T2; the first electrode plate 21 between T1 and T2 in the thickness direction of the electrode assembly is provided with the first electrode tab 22; all of the first electrode tabs 22 are bent toward the center of the electrode assembly to form a first multi-tab structure 23, and the first adapter piece 1 is directly connected to the first multi-tab structure 23. There is only one layer of first adapter member in the L direction of the electrode assembly. The specific method of adapter welding is: all of the first electrode tabs 22 are bent away from the center of the electrode assembly for extending and are neatly stacked to form the first multi-tab structure 23, followed by adapting-welding with the first adapter piece 1; after welding, the first adapter piece 1 is led out, so that there is only one layer of first adapter member in the L direction. The first connection position 11 is located between T2 and T3 in the thickness direction.

In the above specific embodiment, the second electrode tab is disposed in the same manner as the first electrode tab 22, and the second adapter piece is disposed in the same manner as the first adapter piece 1. Further preferably, the first adapter piece and the second electrode tab adapter piece are relatively aligned, so that the first and second adapter electrode tabs of the same tab adhesive may be used to connect the positive and negative electrode tabs at one time, thereby ensuring the spacing of the electrode tabs and facilitating the packaging.

Figure 7:
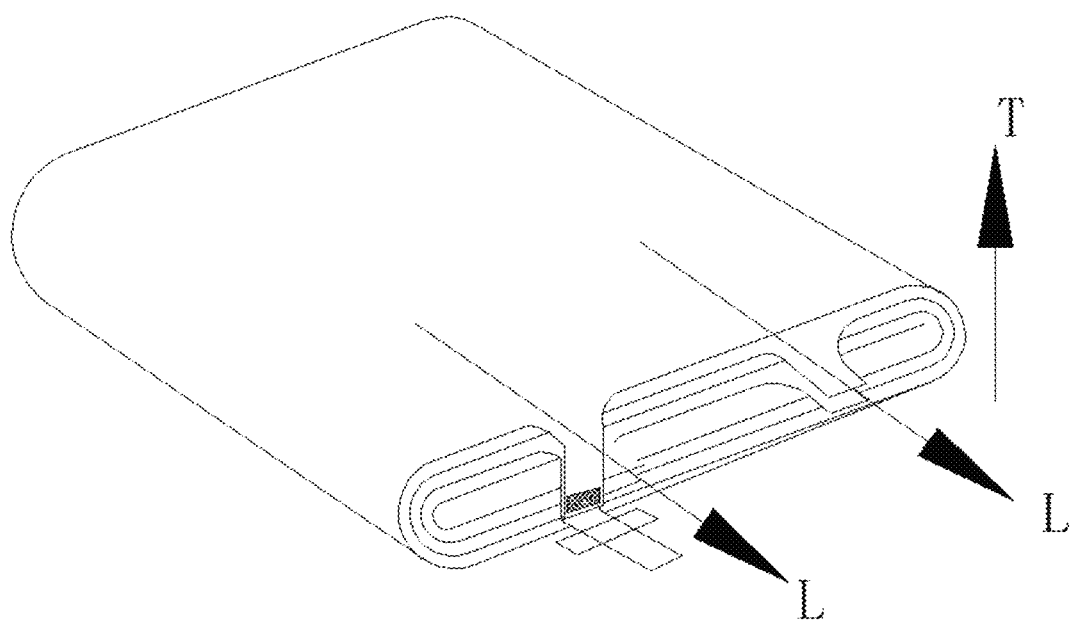
FIG. 7 is a schematic view of a wound electrode assembly according to an embodiment of the present application.
Figure 8:
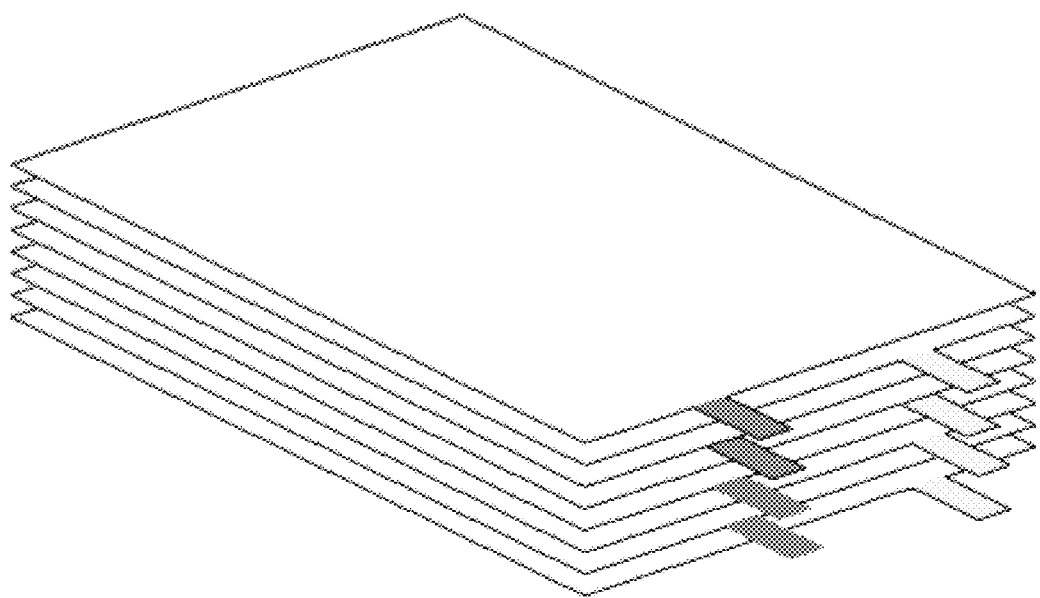
FIG. 8 is a schematic view of a laminated electrode assembly according to an embodiment of the present application.

In the above specific embodiment, the electrode assembly 2 is a wound electrode assembly as shown in FIG. 7, and may be a laminated electrode assembly as shown in FIG. 8, and may be a laminated hybrid wound electrode assembly.

In the above specific embodiment, the first electrode plate 21 is a positive electrode plate, and the second electrode plate is a negative electrode plate; or the first electrode plate 21 is a negative electrode plate, and the second electrode plate is a positive electrode plate.

The present application, while disclosed above as a preferred embodiment, is not intended to limit the claims. Those skilled in the art can make several possible changes and modifications without departing from the concept of the present application. Therefore, the scope of protection of the present application should be determined by the scope defined by the claims of the present application.

What is claimed is:

1. A secondary battery, comprising a first adapter piece and an electrode assembly, the electrode assembly comprising a first electrode plate, and a plurality of first electrode tabs, a direction parallel to the first electrode plate being L, two end points in a thickness direction of the electrode assembly being T1 and T3 respectively, wherein a position of one of the first electrode tabs farthest from T1 or T3 is T2; all the first electrode tabs are stacked and welded to form a first multi-tab structure, a first adapter piece being connected to a connection position, and a first adapter member is formed from the first adapter piece and the first multi-tab structure; in the L direction, there is at most one layer of the first adapter member, and wherein the first multi-tab structure comprises a bending point, and the first multi-tab structure is bent from the bending point towards the connection position along the thickness direction of the electrode assembly, such that a gap is formed between the electrode assembly and a portion of the first multi-tab structure extending from the bending point to the connection position; and wherein the first adapter piece is bent and partially inserted into the gap to connect to the connection position.

2. The secondary battery according to claim 1, wherein all of the first electrode tabs are located between T1 and T2 in the thickness direction of the electrode assembly.

3. The secondary battery according to claim 1, wherein the first multi-tab structure is formed by all of the first electrode tabs bent away from a center of the electrode assembly.

4. The secondary battery according to claim 3, wherein the first adapter piece is connected to the first multi-tab structure that is bent toward the center of the electrode assembly.

5. The secondary battery according to claim 1, wherein the first multi-tab structure is formed by all of the first electrode tabs bent toward a center of the electrode assembly.

6. The secondary battery according to claim 5, wherein the first adapter piece is connected to the first multi-tab structure that is bent away from the center of the electrode assembly.

7. The secondary battery according to claim 6, wherein all of the first electrode tabs are located between T1 and T2 in the thickness direction of the electrode assembly.

8. The secondary battery according to claim 7, wherein the bending point of the first multi-tab structure and all of the first electrode tabs are located between T1 and T2 in the thickness direction of the electrode assembly.

9. The secondary battery according to claim 1, wherein all of the first electrode tabs are located between T1 and T2 in the thickness direction of the electrode assembly, the connection position of the first adapter piece and the first multi-tab structure is a first connection position.

10. The secondary battery according to claim 9, wherein the first connection position partially overlap with all of the first electrode tabs in the L direction.

11. The secondary battery according to claim 9, wherein the first connection position does not overlap with all of the first electrode tabs in the L direction.

12. The secondary battery according to claim 1, wherein the electrode assembly is a wound electrode assembly.

13. The secondary battery according to claim 1, wherein the electrode assembly is a laminated electrode assembly.

14. The secondary battery according to claim 1, wherein the electrode assembly is a wound hybrid laminated electrode assembly.

15. The secondary battery according to claim 1, wherein the first electrode plate is a positive electrode plate.

16. The secondary battery according to claim 1, wherein the first electrode plate is a negative electrode plate.

17. The secondary battery according to claim 1, wherein the connection position of the first adapter piece and the first multi-tab structure is a first connection position.

18. The secondary battery according to claim 1, wherein the position of one of the first electrode tabs farthest from T1 is T2, and all the first electrode tabs are positioned between T1 and T2 in the thickness direction of the electrode assembly, wherein the first adapter piece is bent at the T2 position in a direction toward the gap between the first adapter member and the electrode assembly.

* * * * *